(12) United States Patent
Wang et al.

(10) Patent No.: US 9,667,066 B2
(45) Date of Patent: May 30, 2017

(54) WIND POWER BUNDLING CONTROL METHOD AFTER WIND POWER AND THERMAL POWER ARE CONNECTED TO GRID

(71) Applicants: GANSU ELECTRIC POWER CORPORATION WIND POWER TECHNOLOGY CENTER, Lanzhou, Gansu Province (CN); STATE GRID GANSU ELETRIC POWER CORPORATION, Lanzhou, Gansu Province (CN); STATE GRID CORPORATION OF CHINA, Beijing (CN); NORTH CHINA ELECTRIC POWER UNIVERSITY, Beijing (CN)

(72) Inventors: Ningbo Wang, Lanzhou (CN); Wenying Liu, Lanzhou (CN); Yanhong Ma, Lanzhou (CN); Jiaming Wang, Lanzhou (CN); Dan Jin, Lanzhou (CN); Cai Liang, Lanzhou (CN); Shiyuan Zhou, Lanzhou (CN); Xiaodan Wu, Lanzhou (CN); Kun Ding, Lanzhou (CN); Zilan Zhao, Lanzhou (CN); Qiang Zhou, Lanzhou (CN); Bin Yang, Lanzhou (CN); Jin Li, Lanzhou (CN); Peng Xu, Lanzhou (CN); Long Zhao, Lanzhou (CN); Rundong Ge, Lanzhou (CN)

(73) Assignees: GANSU ELECTRIC POWER CORPORATION WIND POWER TECHNOLOGY CENTER, Gansu Province (CN); STATE GRID GANSU ELETRIC POWER CORPORATION, Gansu Province (CN); STATE GRID CORPORATION OF CHINA, Beijing (CN); NORTH CHINA ELECTRIC POWER UNIVERSITY, Beijing (CN)

( * ) Notice: Subject to any disclaimer, the term of this patent is extended or adjusted under 35 U.S.C. 154(b) by 178 days.

(21) Appl. No.: 14/649,202
(22) PCT Filed: Apr. 16, 2014
(86) PCT No.: PCT/CN2014/000417
§ 371 (c)(1),
(2) Date: Jun. 2, 2015
(87) PCT Pub. No.: WO2014/169706
PCT Pub. Date: Oct. 23, 2014

(65) Prior Publication Data
US 2015/0349528 A1 Dec. 3, 2015

(30) Foreign Application Priority Data
Apr. 17, 2013 (CN) .......................... 2013 1 0134182

(51) Int. Cl.
H02J 3/00 (2006.01)
H02J 3/46 (2006.01)
H02J 3/38 (2006.01)

(52) U.S. Cl.
CPC ................ *H02J 3/00* (2013.01); *H02J 3/386* (2013.01); *H02J 3/46* (2013.01); *Y02E 10/763* (2013.01); *Y10T 307/549* (2015.04)

(58) Field of Classification Search
CPC ..... H02J 3/386; Y02E 10/763; Y10T 307/549
(Continued)

(56) References Cited

FOREIGN PATENT DOCUMENTS

| CN | 102064562 A | 5/2011 |
| CN | 102957166 A | 3/2013 |

(Continued)

*Primary Examiner* — Robert Deberadinis

(74) *Attorney, Agent, or Firm* — Jiwen Chen

(57) ABSTRACT

The present invention has disclosed a wind power bundling control method after wind power and thermal power are connected to a power grid in the field of electric power system security technology, including regulating wind power output and thermal power output forward or backward; calculating the transient stability margin of the grid, load level index of element and voltage out-of-limit index of busbar after regulating wind power output and thermal power output respectively; calculating wind power/thermal power paying value according to the transient stability margin of the grid, load level index of element and voltage out-of-limit index of busbar after regulating wind power output and thermal power output; if wind power/thermal power paying value is larger than set threshold value, regulating wind power output and thermal power output backward/forward; if wind power/thermal power paying value is smaller than set threshold value, regulating wind power output and thermal power output forward/backward. The present invention provides a wind power bundling control method after wind power and thermal power are connected to the power grid to ensure reasonable output of wind power and thermal power, so as to guarantee the power grid operates normally.

10 Claims, 2 Drawing Sheets

(58) Field of Classification Search
USPC .............................................................. 307/2
See application file for complete search history.

(56) References Cited

FOREIGN PATENT DOCUMENTS

| | | |
|---|---|---|
| CN | 103236719 A | 8/2013 |
| JP | 2007244127 A | 9/2007 |

WIND POWER BUNDLING CONTROL METHOD AFTER WIND POWER AND THERMAL POWER ARE CONNECTED TO GRID

This is a U.S. national stage application of PCT Application No. PCT/CN2014/000417 under 35 U.S.C. 371, filed Apr. 16, 2014 in Chinese, claiming the priority benefit of Chinese Application No. 201310134182.7, filed Apr. 17, 2013, which is hereby incorporated by reference.

TECHNICAL FIELD

The present invention belongs to the field of security technology for an electric power system, especially relates to a wind power bundling control method after wind power and thermal power are connected to a grid.

BACKGROUND TECHNOLOGY

Because of the characteristics of wind resource distribution and development status of power grid in China, "Three Norths" (northwest China, north China and northeast China) that have rich wind resources in China have the characteristics of large-scale centralized development and as wind power plants are generally the terminal of an electric power system, local load is relatively low and power grid is weak, wind power cannot be totally consumed locally, so that it needs to be delivered to other places. However, due to the randomness and volatility of wind power, it is difficult to control wind power delivery. In addition, the annual utilization hours are low, economical efficiency of independent long-distance transmission is poor and volatility of wind power transmitting power is high. All these problems have seriously influenced safe and stable operation of the electric power system.

Considering that the regions with rich wind resources are also of rich coal resources, if the wind power and thermal power are "bundled" together for delivery, through coordinated control of wind power and thermal power, it not only can guarantee "bundling" delivery cross-section not exceed the stability limit, reduce fluctuations of the line power while fully using wind resources and taking full advantage of transmission channel, but also can improve reserve capacity of the system. Further, it is also beneficial to the security and stability of the system and significantly decreases power supply cost of the receiving end as well.

At present, wind power and thermal power "bundling" coordinated delivery has been widely used in China. A lot of researches have been made on "bundling" control strategy, objectives of which mainly focus on optimizing generation scheduling of a thermal power generating unit, reducing fluctuating power of a transmission line, improving wind power consumption capacity, solving the problems as thermal reserve capacity of a grid reduces and optimizing wind-thermal structural proportion that are generated during wind power and thermal power "bundling" coordinated delivery. However, few researches have been made in optimal control of wind-thermal power coordination.

SUMMARY OF THE INVENTION

The present invention is made to provide a wind power bundling control method after wind power and thermal power are connected to power grid, so as to solve the problems existed in grid connection and power supply of wind power and thermal power.

In order to realize the above purpose, the technical solution put forward in the present invention is a wind power bundling control method after wind power and thermal power are connected to power grid characterized in the methods, comprising:

step 1: regulating wind power output and thermal power output forward or backward;

The regulation of the wind power output and thermal power output forward refers to decreasing thermal power output and increasing wind power output;

The regulation of the wind power output and thermal power output backward refers to decreasing wind power output and increasing thermal power output;

step 2: calculating a transient stability margin of a grid $\lambda_{SI}$, a load level index of an element $\lambda_L$ and a voltage out-of-limit index of a busbar $\lambda_U$ respectively after regulating the wind power output and thermal power output;

step 3: calculating a wind power/thermal power paying value according to the transient stability margin of the grid $\lambda_{SI}$, a load level index of the element $\lambda_L$ and the voltage out-of-limit index of the busbar $\lambda_U$ after regulating wind power output and thermal power output;

step 4: if wind power/thermal power paying value is larger than set threshold value, regulating the wind power output and thermal power output backward/forward; if wind power/thermal power paying value is smaller than set threshold value, regulating wind power output and thermal power output forward/backward.

After the step 4, the method also includes ensuring wind power output and thermal power output after regulating the wind power output and thermal power output.

For calculating the transient stability margin of the grid $\lambda_{SI}$ after regulating the wind power output and thermal power output, $$\lambda_{sI} = \sum_{\gamma}\left(\frac{P_{i-1}}{P_{i-0}}\right)$$

is adopted, wherein, $\gamma$ is the set of key cross-sections, $P_{i-1}$ and $P_{i-0}$ are stability limits of the i cross-section before and after regulating wind power output and thermal power output forward/backward respectively, and $1 \le i \le k$, k refers to number of the elements in the set of key cross-sections.

For calculating the load level index of element $\lambda_L$ after regulating wind power output and thermal power output, $$\lambda_L = \sum_{l \in \alpha} \rho_l (S_l / S_l^{max})^{2n}$$

is adopted, wherein, $\alpha$ is set of system elements, namely the set of transmission lines and transformers with voltage class of 330 kV or above; $\rho_l$ is weight factor of system element l; $S_l$ is power of transmission line l; $S_l^{max}$ is upper limit of the power of transmission line l; n is the parameter used to prevent masking effect from happening during calculation.

For calculating the voltage out-of-limit index of the busbar $\lambda_U$ after regulating wind power output and thermal power output, $$\lambda_U = \sum_{\beta} \rho_i \left(\frac{U_i - U_i^{SP}}{\Delta U_i^{lim}}\right)^{2n}$$

is adopted, wherein, β is the set of busbar; $\rho_i$ is the weight factor of the i busbar; $U_i$ is voltage amplitude of the i busbar, $U_i^{SP}=(U_i^H+U_i^L)/2$ and $\Delta U_i^{lim}=(U_i^H-U_i^L)/2$, $U_i^H$ and $U_i^L$ refer to the upper limit and lower limit of the voltage amplitude of the i busbar, respectively; n is the parameter used to prevent masking effect from happening during calculation.

For calculating the wind power/thermal power paying value according to the transient stability margin of the grid $\lambda_{SI}$, the load level index of element $\lambda_L$ and voltage out-of-limit index of the busbar $\lambda_U$, $\lambda=\omega_1\cdot\lambda_{SI}+\omega_2\cdot\lambda_L+\omega_3\cdot\lambda_U$ is adopted, wherein, $\omega_1$, $\omega_2$ and $\omega_3$ are set weight factors of the transient stability margin of a grid, a load level index of element and voltage out-of-limit index of the busbar respectively and $$\sum_{i=1}^{3} \omega_i = 1.$$

The present invention provides a wind power bundling control method after wind power and thermal power are connected to a power grid to ensure reasonable output of the wind power and thermal power, so as to guarantee the grid operates normally.

Other characteristics of the present invention and advantages will be explained in the latter part of the specification, and will be obvious partially from the specification, or can be understood through implementation of the present invention. The object and other advantages of the present invention can be achieved and obtained through the structures specifically pointed in this specification, claims and drawings.

With reference to the drawings and the embodiments, the technical solution of the present invention are further explained in detail as follows.

BRIEF DESCRIPTION OF THE DRAWINGS

The drawings are provided for further understanding of the present invention. The drawings are a part of the specification and used together with the embodiments of the present invention to explain the present invention and do not constitute limitations to the present invention.

EMBODIMENTS OF THE INVENTION

Integrating attached drawings, optimal implementation cases are illustrated below. It should be noted that the following illustrations are only examples, but not to limit the range and applications of the present invention.

Embodiment 1

Figure 1:
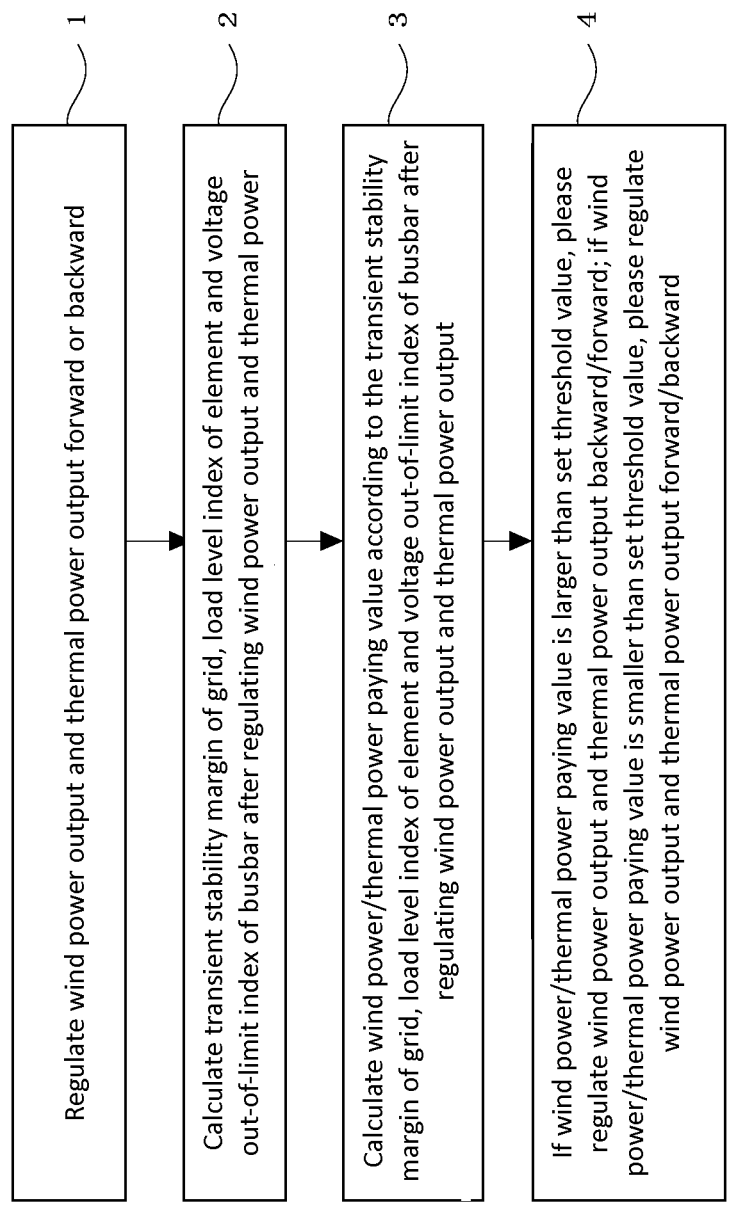
FIG. 1 is a flow chart for the wind power bundling control method after wind power and thermal power are connected to power grid.

FIG. 1 is a flow chart for the wind power bundling control method after the wind power and thermal power are connected to a power grid. As it is shown in FIG. 1, the wind power bundling control method after wind power and thermal power are connected to power grid put forward in the present invention, comprises:

Step 1: regulating wind power output and thermal power output forward or backward.

Regulating wind power output and thermal power output forward refers to decreasing thermal power output and increasing wind power output. Regulating wind power output and thermal power output backward refers to decreasing wind power output and increasing thermal power output.

Step 2: calculating a transient stability margin of the grid $\lambda_{SI}$, a load level index of the element $\lambda_L$ and a voltage out-of-limit index of the busbar $\lambda_U$ respectively after regulating wind power output and thermal power output.

The transient stability margin of the grid $\lambda_{SI}$ after regulating wind power output and thermal power output is calculated with the following formula:

$$\lambda_{SI} = \sum_{\gamma} \left(\frac{P_{i-1}}{P_{i-0}}\right) \tag{1}$$

wherein, γ is the set of key cross-sections, which can be confirmed with the interprovincial cross-sections and the important cross-sections in the province defined in Annual Operation Mode issued by different provincial electric power companies. $P_{i-1}$ and $P_{i-0}$ refer to the stability limits of the i cross-section before and after regulating wind power output and thermal power output forward/backward respectively, and $1\le i\le k$ and k represents the number of the elements in the set of key cross-sections. PSASP (power system analysis software package) is adopted to calculate $P_{i-1}$ and $P_{i-0}$, which are the stability limits of cross-section before and after regulating wind power output and thermal power output offline.

The load level index of element $\lambda_L$ after regulating wind power output and thermal power output is calculated with the following formula:

$$\lambda_L = \sum_{l\in\alpha} \rho_l(S_l/S_l^{max})^{2n} \tag{2}$$

wherein, α is a set of system elements, namely the set of transmission lines and transformers with voltage class of 330 kV or above; $\rho_l$ is a weight factor of the system element l, value of which takes the number of its load rate; $S_l$ is the power of the transmission line l, which can be obtained directly from EMS (energy management system) of the electric power company control center, and during offline calculation, the power of any transmission line can be calculated through power flow calculation with PSASP (Power System Analysis Software Package); $S_l^{max}$ is the upper limit of the power of the transmission line l; $S_l^{max}$ is rated transmitting power of the element on this transmission line and it can be calculated with the formula $S_{l\,max}=\sqrt{3}U_0I_0\cos\phi$, wherein, $U_0$ is the rated voltage of this line, $I_0$ is rated transmitting current and cos co is the power factor, which generally takes 0.95; $S_{l\,max}$ of the transformer is the value on the nameplate; n is the parameter used to prevent masking effect from happening during calculation. If selecting n as 1, not only masking effect can be avoided, the requirements for calculation speed also can be met, and its description for the difference of limit level is also very appropriate.

The voltage out-of-limit index of the busbar $\lambda_U$ after regulating wind power output and thermal power output is calculated with the following formula:

$$\lambda_U = \sum_\beta \rho_i \left( \frac{U_i - U_i^{SP}}{\Delta U_i^{lim}} \right)^{2n} \quad (3)$$

wherein, $\beta$ is a set of busbar, namely the set of transmission lines with voltage class of 330 kV or above; $\rho_i$ is a weight factor of the i busbar; $U_i$ is a voltage amplitude of the i busbar, the value of which takes the number of load rate; $U_i$ is the voltage amplitude of the i busbar, which can be obtained directly from EMS (energy management system) of the electric power company control center, and during offline calculation, the power of any transmission line can be calculated through power flow calculation with PSASP; $U_i^{SP}=(U_i^H+U_i^L)/2$ and $\Delta U_i^{lim}=(U_i^H-U_i^L)/2$, $U_i^H$ and $U_i^L$ refer to the upper limit and lower limit of voltage amplitude of the i busbar respectively. Generally, according to the regulations of security and stability guide of the State Grid Corporation of China, the upper limit of the voltage amplitude of the busbar is 1.1 times of rated voltage of this voltage class and the lower limit is its rated voltage; n is the parameter used to prevent masking effect from happening during calculation. If selecting n as 1, not only masking effect can be avoided, the requirements for calculation speed also can be met, and its description for the difference of limit level is also very appropriate.

Step 3: calculating wind power/thermal power paying value according to the transient stability margin of the grid $\lambda_{Sl}$, the load level index of element $\lambda_L$ and the voltage out-of-limit index of the busbar $\lambda_U$ after regulating wind power output and thermal power output.

Calculating wind power/thermal power paying value according to the transient stability margin of the grid $\lambda_{Sl}$, the load level index of element $\lambda_L$ and the voltage out-of-limit index of the busbar $\lambda_U$, the following formula is adopted:

$$\lambda = \omega_1 \cdot \lambda_{Sl} + \omega_2 \cdot \lambda_L + \omega_3 \cdot \lambda_U \quad (4)$$

wherein, $\omega_1$, $\omega_2$ and $\omega_3$ are set weight factors of the transient stability margin of the grid, load level index of element and voltage out-of-limit index of the busbar respectively and $$\sum_{i=1}^{3} \omega_i = 1.$$

Weight factors $\omega_1$, $\omega_2$ and $\omega_3$ are confirmed according to actual conditions of the power grid, which are generally set value.

Step 4: if wind power/thermal power paying value is larger than the set threshold value, regulating wind power output and thermal power output backward/forward; if wind power/thermal power paying value is smaller than set threshold value, regulating wind power output and thermal power output forward/backward.

After regulating wind power output and thermal power output as Step 4, wind power output and thermal power output can be confirmed with EMS and this result is output power of wind power and thermal power after wind power bundling control.

Embodiment 2

Using the power grid in Hexi, Gansu Province in 2012 as an implementation case of the present invention, the contents of the invention are further illustrated as follows.

Figure 2:
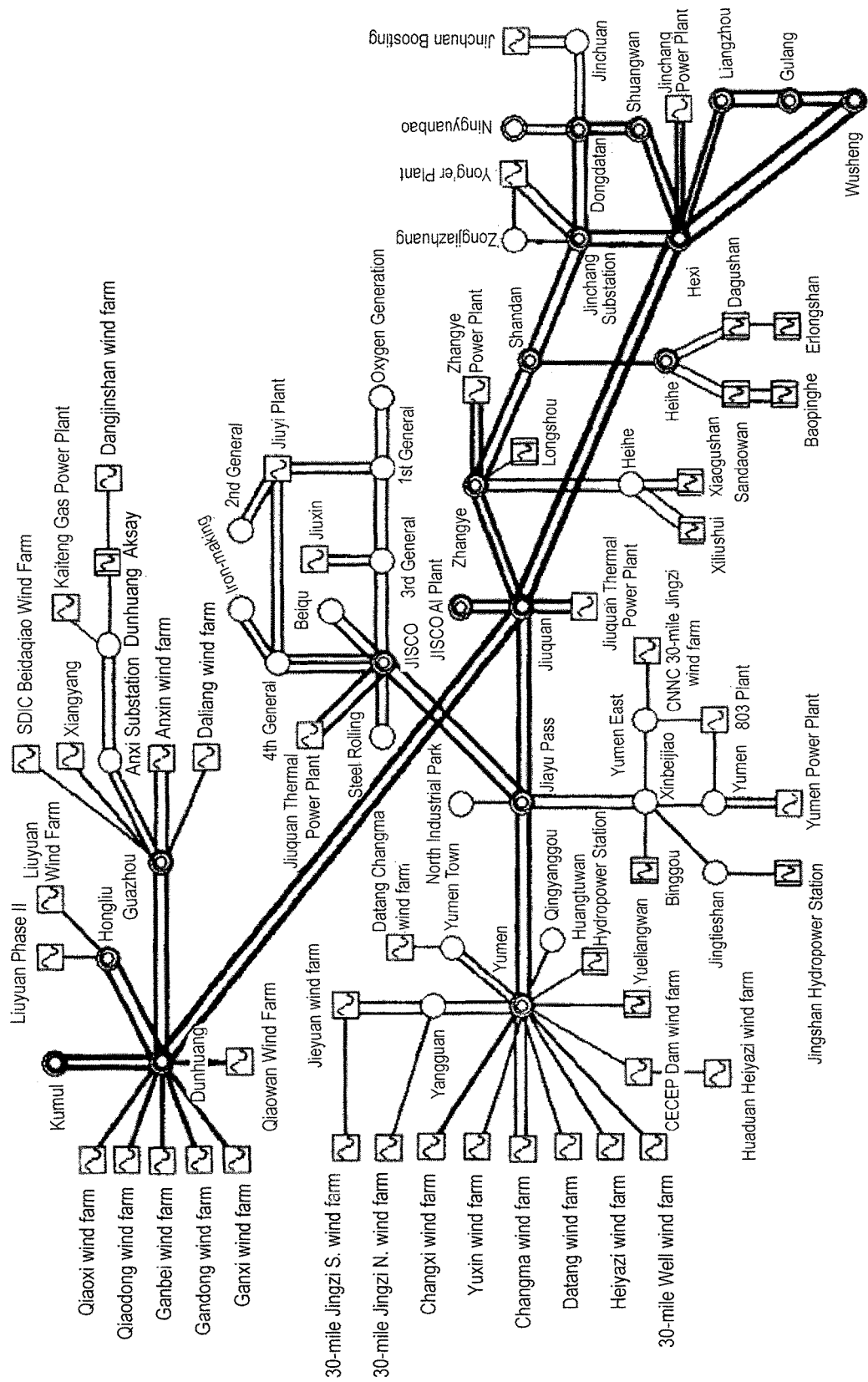
FIG. 2 is a grid wiring diagram provided by implementation case.

A wiring diagram of the power grid in Hexi, Gansu Province is shown in FIG. 2. In 2012, total installed capacity of its wind power is 6,915.1 MW and total installed capacity of its thermal power is 4,500 MW. In October 2012, its wind power output in Gansu Province is planned to be 2,800 MW, which is the maximum wind power output.

Key cross-sections of the power grid in Hexi, Gansu Province include 750 kV Dunhuang-Jiuquan Double-circuit Line Cross-section, 750 kV Jiuquan-Hexi Double-circuit Line Cross-section and 750 kV Hexi-Wusheng Double-circuit Line Cross-section. According to *Operation Mode of Gansu's Power Grid in* 2012, transient stability limits of all the cross-sections are shown in Table 1.

TABLE 1

Table of Transient Stability Limit of Key Cross-sections

| Key cross-section | Transient stability limit (MW) |
|---|---|
| 750 kV Dunhuang-Jiuquan Double-circuit Line Cross-section | 3400 |
| 750 kV Jiuquan-Hexi Double-circuit Line Cross-section | 3400 |
| 750 kV Hexi-Wusheng Double-circuit Line Cross-section | 3500 |

Pursuant to lines of the power grid, rated capacity of transformer and operating requirements of the busbar voltage of 750/330 kV substations in Hexi, Gansu Province, wind power paying value is calculated after regulating wind power output and thermal power output, wherein, weight factors of transient stability margin of the grid, the load level index of the element and the voltage out-of-limit index of the busbar are 0.4, 0.3 and 0.3 respectively. Then wind power paying value $\lambda_0=21.48$ is obtained.

Regulating measure for wind power is 200 MW each time and regulating measure for thermal power is 100 MW each time. While delivering 1,000 MW under boundary conditions as Sinkiang, coordinative optimal control process of wind power and thermal power bundling in Hexi is shown in Table 2. Considering voltage regulating measures in Hexi, backward regulations mainly include actions of dynamic reactive compensation devices like SVC and SVG, actions of fixed capacitor and resistor and power factor control of wind-thermal power supply.

TABLE 2

Game Process for Wind Power and Thermal Power Bundling Coordinative Optimal Control in Hexi

| Forward regulation | Wind power paying value | Threshold value | Backward regulation | Thermal power paying value |
|---|---|---|---|---|
| Wind power output 1600 MW Thermal power output 2800 MW | 14.35 | 21.48 | — | — |

TABLE 2-continued

Game Process for Wind Power and Thermal Power Bundling Coordinative Optimal Control in Hexi

| Forward regulation | Wind power paying value | Threshold value | Backward regulation | Thermal power paying value |
|---|---|---|---|---|
| Wind power output 1800 MW Thermal power output 2600 MW | 16.27 | 21.48 | — | — |
| Wind power output 2000 MW Thermal power output 2400 MW | 19.22 | 21.48 | — | — |
| Wind power output 2200 MW Thermal power output 2200 MW | 22.09 | 21.48 | Wind power output 2100 MW Thermal power output 2300 MW | No power flow overload or busbar voltage out-of-limit |
| Wind power output 2300 MW Thermal power output 2100 MW | 20.55 | 21.48 | — | — |
| Wind power output 2500 MW Thermal power output 19000 MW | 23.68 | 21.48 | Wind power output 2400 MW Thermal power output 2000 MW | No power flow overload or busbar voltage out-of-limit |
| Wind power output 2600 MW Thermal power output 18000 MW | 22.05 | 21.48 | Wind power output 2500 MW Thermal power output 1900 MW | No power flow overload or busbar voltage out-of-limit |
| Wind power output 2700 MW Thermal power output 17000 MW | 22.46 | 21.48 | Wind power output 2600 MW Thermal power output 1800 MW | Busbar voltage out-of-limit happens |
| — | — | — | Wind power output 2500 MW Thermal power output 1900 MW | Optimal control ends |

It can be concluded from Table 2 that after optimal control, wind power output is 2,500 MW and thermal power output is 1,900 MW.

What is said above is only a good specific implementation method of the present invention, but the protective scope of the present invention is not confined to these embodiments. Any changes or replacements that the person of ordinary skills in the art in this technical field can figure out easily are within the protection scope of the present invention. Therefore, the protection scope of the present invention should be subject to the protection scope of the claims.

The invention claimed is:

1. A wind power bundling control method after wind power and thermal power are connected to a grid characterized in the method comprises:

step 1: providing initial values for winder power output and thermal power output, regulating wind power output and thermal power output forward under the condition of satisfying transient stability of the grid or regulating wind power output and thermal power output backward under the condition where the transient stability of the grid is not satisfied; wherein regulating wind power output and thermal power output forward refers to decreasing thermal power output and increasing wind power output; and regulating wind power output and thermal power output backward refers to decreasing wind power output and increasing thermal power output;

step 2: calculating a transient stability margin of the grid $\lambda_{SI}$, a load level index of an element $\lambda_L$ and a voltage out-of-limit index of a busbar $\lambda_U$ respectively after regulating wind power output and thermal power output;

step 3: calculating wind power/thermal power paying value according to the transient stability margin of the grid $\lambda_{SI}$, the load level index of the element $\lambda_L$ and the voltage out-of-limit index of the busbar $\lambda_U$ after regulating wind power output and thermal power output;

step 4: if wind power/thermal power paying value is larger than preset threshold value, regulating wind power output and thermal power output backward; if wind power/thermal power paying value is smaller than preset threshold value, regulating wind power output and thermal power output forward.

2. The control method according to claim 1, characterized in that, after the Step 4, the method further comprises determining wind power output and thermal power output after regulating wind power output and thermal power output.

3. The control method according to claim 1, characterized in that, when calculating transient stability margin of the grid $\lambda_{SI}$ after regulating wind power output and thermal power output, $$\lambda_{SI} = \sum_{\gamma} \left( \frac{P_{i-1}}{P_{i-0}} \right)$$

is adopted, wherein, $\gamma$ is a set of key cross-sections, $P_{i-1}$ and $P_{i-0}$ are stability limits of the i cross-section before and after regulating wind power output and thermal power output forward/backward respectively, and $1 \leq i \leq k$, k refers to the number of the elements in the set of key cross-sections.

4. The control method according to claim 1, characterized in that, when calculating load level index of element $\lambda_L$ after regulating wind power output and thermal power output, $$\lambda_L = \sum_{l \in \alpha} \rho_l (S_l / S_l^{max})^{2n}$$

is adopted, wherein, α is a set of system elements, namely the set of transmission lines and transformers with voltage class of 330 kV or above; $\rho_l$ is a weight factor of a system element l; $S_l$ is power of transmission line l; $S_l^{max}$ is an upper limit of the power of transmission line l; n is the parameter used to prevent masking effect from happening during calculation.

5. The control method according to claim 1, characterized in that, when calculating voltage out-of-limit index of busbar $\lambda_U$ after regulating wind power output and thermal power output, $$\lambda_U = \sum_{\beta} \rho_i \left( \frac{U_i - U_i^{SP}}{\Delta U_i^{lim}} \right)^{2n}$$

is adopted, wherein, β is a set of the busbar; $\rho_i$ is a weight factor of the i busbar; $U_i$ is voltage amplitude of the i busbar, $U_i^{SP}=(U_i^H+U_i^L)/2$ and $\Delta U_i^{lim}=(U_i^H-U_i^L)/2$, $U_i^H$ and $U_i^L$ referring to an upper limit and a lower limit of voltage amplitude of the i busbar respectively; n is the parameter used to prevent masking effect from happening during calculation.

6. The control method according to claim 1, characterized in that, when calculating wind power/thermal power paying value according to transient stability margin of the grid $\lambda_{SI}$, the load level index of the element $\lambda_L$ and voltage out-of-limit index of the busbar $\lambda_U$, $\lambda=\omega_1\cdot\lambda_{SI}+\omega_2\cdot\lambda_L+\omega_3\cdot\lambda_U$ is adopted, wherein, $\omega_1$, $\omega_2$ and $\omega_3$ are set weight factors of transient stability margin of the grid, the load level index of element and voltage out-of-limit index of the busbar respectively and $$\sum_{i=1}^{3} \omega_i = 1.$$

7. The control method according to claim 2, characterized in that, when calculating transient stability margin of the grid $\lambda_{SI}$ after regulating wind power output and thermal power output, $$\lambda_{SI} = \sum_{\gamma} \left( \frac{P_{i-1}}{P_{i-0}} \right)$$

is adopted, wherein, γ is a set of key cross-sections, $P_{i-1}$ and $P_{i-0}$ are stability limits of the i cross-section before and after regulating wind power output and thermal power output forward/backward respectively, and $1\leq i\leq k$, k refers to the number of the elements in the set of key cross-sections.

8. The control method according to claim 2, characterized in that, when calculating load level index of element $\lambda_L$ after regulating wind power output and thermal power output, $$\lambda_L = \sum_{l \in \alpha} \rho_l (S_l / S_l^{max})^{2n}$$

is adopted, wherein, α is a set of system elements, namely the set of transmission lines and transformers with voltage class of 330 kV or above; $\rho_l$ is a weight factor of a system element l; $S_l$ is power of transmission line l; $S_l^{max}$ is an upper limit of the power of transmission line l; n is the parameter used to prevent masking effect from happening during calculation.

9. The control method according to claim 2, characterized in that, when calculating voltage out-of-limit index of busbar $\lambda_U$ after regulating wind power output and thermal power output, $$\lambda_U = \sum_{\beta} \rho_i \left( \frac{U_i - U_i^{SP}}{\Delta U_i^{lim}} \right)^{2n}$$

is adopted, wherein, β is a set of the busbar; $\rho_i$ is a weight factor of the i busbar; $U_i$ is voltage amplitude of the i busbar, $U_i^{SP}=(U_i^H+U_i^L)/2$ and $\Delta U_i^{lim}=(U_i^H-U_i^L)/2$, $U_i^H$ and $U_i^L$ referring to an upper limit and a lower limit of voltage amplitude of the i busbar respectively; n is the parameter used to prevent masking effect from happening during calculation.

10. The control method according to claim 2, characterized in that, when calculating wind power/thermal power paying value according to transient stability margin of the grid $\lambda_{SI}$, the load level index of the element $\lambda_L$ and voltage out-of-limit index of the busbar $\lambda_U$, $\lambda=\omega_1\cdot\lambda_{SI}+\omega_2\cdot\lambda_L+\omega_3\cdot\lambda_U$ is adopted, wherein, $\omega_1$, $\omega_2$ and $\omega_3$ are set weight factors of transient stability margin of the grid, the load level index of element and voltage out-of-limit index of the busbar respectively and $$\sum_{i=1}^{3} \omega_i = 1.$$

* * * * *